(No Model.)
C. W. GARIS.
FASTENING DEVICE.
No. 589,525. Patented Sept. 7, 1897.
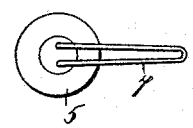
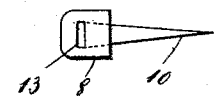
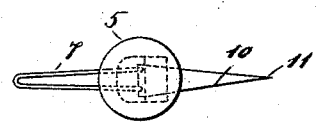
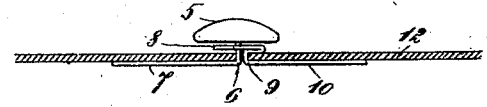
WITNESSES
INVENTOR
Cornelius W. Garis
BY Edgar Tate & Co
ATTORNEYS.

UNITED STATES PATENT OFFICE.

CORNELIUS WEYGANDT GARIS, OF EASTON, PENNSYLVANIA.

FASTENING DEVICE.

SPECIFICATION forming part of Letters Patent No. 589,525, dated September 7, 1897.

Application filed February 23, 1897. Serial No. 624,724. (No model.)

*To all whom it may concern:*

Be it known that I, CORNELIUS WEYGANDT GARIS, a citizen of the United States, residing at Easton, in the county of Northampton and State of Pennsylvania, have invented certain new and useful Improvements in Fastening Devices, of which the following is a full and complete specification, such as will enable those skilled in the art to which it appertains to make and use the same.

This invention relates to fastening devices, and the object thereof is to provide an improved device of this class which is particularly adapted for use in upholstery-work, and which is also adapted to be used as a fastening device for papers and similar purposes, a further object being to provide a fastening device of the class specified which is adapted for use in connection with shoes and other articles.

My improved fastening device consists of two separate parts and is fully disclosed in the following specification, of which the accompanying drawings form a part, in which the separate parts of my improvement are designated by the same numerals of reference in each of the views, and in which—

Figure 1 is a bottom plan view of one part of my improved fastening device; Fig. 2, a similar view of the other part thereof; Fig. 3, a plan view showing the separate parts connected, and Fig. 4 a sectional side view showing the operation thereof.

In the practice of my invention I provide a fastening device one part of which, reference being made to Fig. 1, consists of a suitable head 5, which is provided centrally of the bottom thereof with a short shank 6, on which is formed an arm 7, and the shank 6 and arm 7 are preferably composed of strong spring-wire, said wire being bent to form a loop and the ends thereof being secured to the bottom of the head 5 to form the shank 6.

The other part of the fastening device consists, preferably, of a piece of sheet metal which is bent to form a head 8, which is provided centrally with a depending shank 9, on which is formed an arm 10, which projects at right angles thereto, and the arm 10 is preferably sharpened at the point, as shown at 11, and this part of the fastening device, which is best shown in Figs. 2 and 4, may be composed of wire, if desired.

The operation will be readily understood from the foregoing description when taken in connection with the accompanying drawings and the following statement thereof.

In Fig. 4 I have shown at 12 a fabric or other article with which my improved fastening device is connected, and this view is intended to illustrate the operation of the device in upholstery-work, and in practice the arm 7 and the shank 6 of the head 5 of one part of the fastening device are passed through the central opening 13 in the head 8 of the other part of the fastening device, the arm 10 and the shank 9 of this part of the device having first been passed through the material, and in this position of said parts the arm 7 of the head 5 is turned into the position shown in Fig. 4, after having also been passed through the material 12, as clearly indicated in said figure.

It will be apparent that the head 5 of that part of the device which is shown in Fig. 1 may be of any desired form and may be composed of thin metal, if desired, and it will thus be seen that I accomplish the object of my invention by means of a device which is simple in construction and operation and which is perfectly adapted to accomplish the result for which it is intended. When the separate parts of the fastening device have been passed through the material, as shown in Fig. 4, and the arms 7 and 10 thereof turned at right angles to the heads thereof, it will be impossible to disconnect the fastening device from the material without turning down the arm 7, and this is practically impossible by reason of the position of the arm 7 on the inner side of the material, and my improvement, as will be apparent, thus constitutes a perfectly secure and safe fastener.

Having fully described my invention, I claim as new and desire to secure by Letters Patent—

1. A fastening device consisting of two parts, one of which is provided with a head in which is formed an opening, and to the bottom of which is secured a shank which is provided with an arm which projects at right angles thereto, and the other part consisting of a head which is also provided with a shank, on which is formed an arm which projects at right angles thereto, said arm and said shank being adapted to pass through said opening, substantially as shown and described.

2. The herein-described fastening device, comprising two parts, one part of which consists of a head 5, shank 6, and arm 7; the other part consisting of a head 8, shank 9, and arm 10, said head 8 being provided with an opening 13, substantially as and for the purpose described.

In testimony that I claim the foregoing as my invention I have signed my name, in presence of the subscribing witnesses, this 16th day of February, 1897.

CORNELIUS WEYGANDT GARIS.

Witnesses:
PAUL G. KLINGLER,
JACOB H. WILKING.